United States Patent [19]

Marquardt

[11] Patent Number: 4,559,720
[45] Date of Patent: Dec. 24, 1985

[54] PARTICLE ROASTER

[75] Inventor: Richard H. Marquardt, Litchfield, Minn.

[73] Assignee: Fabridyne, Inc., Litchfield, Minn.

[21] Appl. No.: 535,044

[22] Filed: Sep. 23, 1983

Related U.S. Application Data

[63] Continuation of Ser. No. 277,812, Jun. 26, 1981, abandoned.

[51] Int. Cl.⁴ ............................................. F26B 17/32
[52] U.S. Cl. ...................................... 34/137; 34/135; 432/108
[58] Field of Search .................... 34/135, 136, 137; 432/105, 108, 222; 426/466, 467, 314; 99/474, 478, 483

[56] References Cited

U.S. PATENT DOCUMENTS

| | | | |
|---|---|---|---|
| 2,825,149 | 3/1958 | Miskell | 34/136 |
| 4,262,429 | 4/1981 | Avril | 34/136 |
| 4,286,943 | 9/1981 | Petlak et al. | 431/352 |

Primary Examiner—Larry I. Schwartz
Attorney, Agent, or Firm—James R. Haller

[57] ABSTRACT

A roaster for grain or other particulate material. A chute is provided to feed particles adjacent the bottom of a rotating drum to reduce particle bouncing and unwanted agglomeration and to improve roasting uniformity. Vanes are provided longitudinally within the drum at an angle to lines parallel to the drum axis to improve roasting efficiency.

12 Claims, 14 Drawing Figures

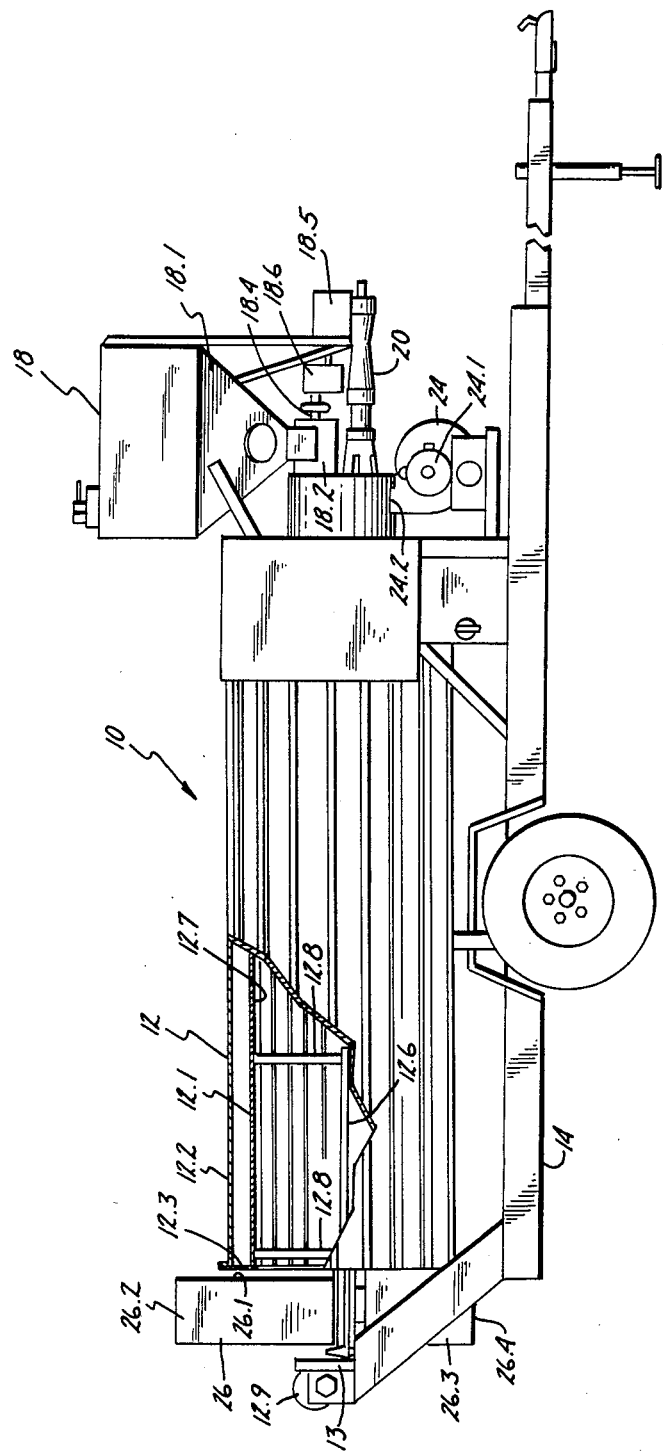

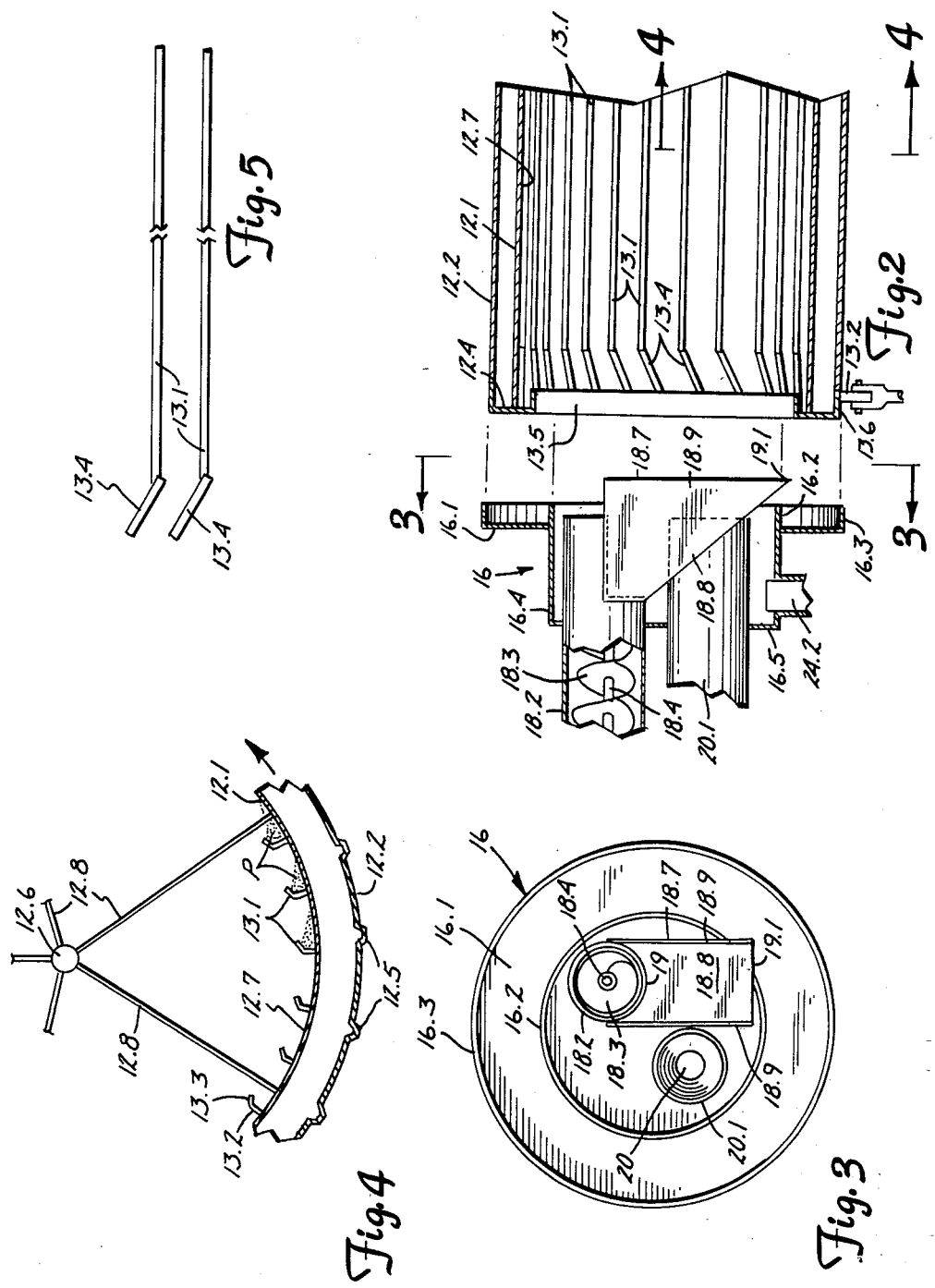

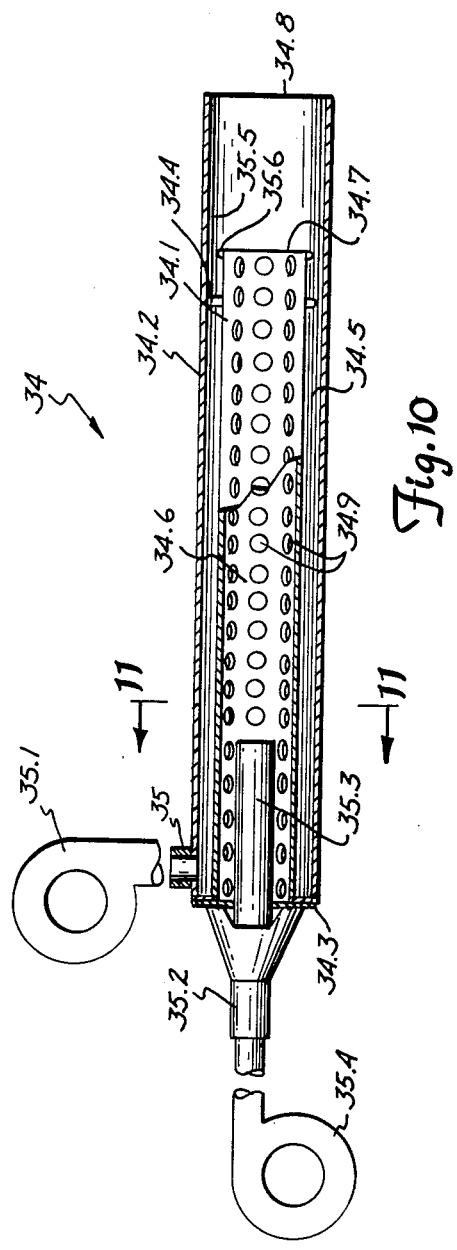
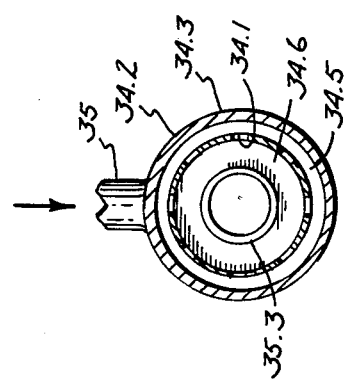

4,559,720

PARTICLE ROASTER

CROSS REFERENCE TO RELATED APPLICATION

This is a continuation of co-pending U.S. application Ser. No. 277,812, filed Jun. 26, 1978 now abandoned.

TECHNICAL FIELD

This invention relates to the field of treating particulate materials with heat, and particularly relates to apparatuses for roasting particles, such as corn, soy beans and other grains, and also other particulate materials, on a continuous basis.

BACKGROUND ART

It has long been known that the food value of grains fed to animals can be improved through a roasting process in which the grain kernels are heated to a high temperature. The roasting process denatures protein in the grain, rendering the grain more susceptible to digestive enzymes of animals, and also tends to change or partially gelatinize starches in the grains to similarly render the starches more susceptible to digestion. Further, the roasting process ordinarily gives rise to a pleasant aroma, rendering roasted feeds more appetizing to animals. See *Roasted Corn vs. High Moisture vs. refrigerated vs. Artificially Dried Whole Shelled Corn,* Progress Report, Iowa State University, A.S. Leaflet R133, August 1970.

The roasting process is quite complicated, and involves various chemical and physical reactions in varying degrees of completeness. If a grain product, such as corn, is underroasted, the product will not have the digestability nor the pleasant aroma of a properly roasted product. On the other hand, overroasting can cause charring, can reduce protein useability, and results in a carmelized, charred odor that is repulsive to animals. Reference is made to Perry, T. W., L. M. Hammond, R. C. Peterson and W. M. Beeson, *Value of Roasting Corn and of injectable Vitamin E or Selenium for Finishing Heifers,* Report of Animal Sciences Department and Lynnwood-Purdue Agricultural Center, Purdue University, 1970.

Various roasters and other heating devices have been proposed. One such device is shown in U.S. Pat. Nos. 3,343,961 and 3,368,475. Another roaster, sold by the applicant, consists of a generally horizontal, rotating drum into which grain or other particulate material is dropped from an auger extending into the drum, and a heater, such as a gas burner, is employed to heat the particles as they fall and are tumbled through rotation of the drum. Although reasonably satisfactory roasting results have been obtained with this device, improvements need to be made to improve the uniformity of the roasting process and to avoid the production of underroasted or overroasted particles and clumps of particles. See also McKenzie, B. A. and J. R. Gottbrath, *High Temperature Grain Processing—Procedures and Equipment-,* American Society of Agricultural Engineers Paper No. 71-814 presented at the 1971 ASAE Winter Meeting, Chicago, Ill. December, 1971.

DISCLOSURE OF INVENTION

The invention, in one embodiment, provides an improvement for feeding grain or other particulate material into a generally horizontal, rotating, cylindrical drum. The roaster includes a drum, the inner surface of which is provided with longitudinally extending, internal vanes to cause tumbling of the grain, and also is provided with heating means adjacent one end of the drum for directing heated gases and/or flames inwardly of the drum. Means also are provided for withdrawing roasted particles from the other end of the drum. The improvement comprises particle feeding means adjacent the one end of the drum and positioned out of the path of the heated gases or flames for feeding particles to the one end of the drum. The feeding means includes chute means having a lower end adjacent the bottom of the internal surface of the drum to deposit particles at the internal bottom surface of the drum adjacent its one end, to thereby reduce the bouncing of the particles and to improve uniformity of the roasting process. As desired, the heating means may comprise an exterior burner such as a gas burner, and an exterior heating tube for directing heated gases from the burner interiorly of the drum, the heating tube being of sufficient length as to completely dissipate flames from the burner along its length so that no flames enter the drum.

In another embodiment, the invention relates to an improvement in a roaster having a generally horizontal, cylindrical, rotating drum comprising means for feeding particles to one end of the drum and for withdrawing particles from the other end of the drum. The improvement comprises an elongated heating tube having spaced inner and outer concentric walls defining an interior passage for flames and heated gases and defining an annular space extending substantially the length of the heating tube, the heating tube being attached at one end to the burner to receive flames and heated gases within its interior passage. The inner wall is provided with apertures to supply air, including combustion air, to the interior passage from the annular space. The outer wall of the burner tube includes at least one port for receiving outside air and for passing the air along the inner wall to receive heat therefrom. The heating tube is of sufficient length as to allow dissipation of flames within the interior passage and to thereby prevent flames from issuing into the drum.

In a further embodiment, the invention provides an improvement in a roaster having a generally horizontal rotating drum with an inner surface, means for introducing particles to one end of the drum and for withdrawing particles from the other end, and heating means adjacent the one drum end for directing heated gases and/or flames into that end of the drum. The improvement comprises a plurality of longitudinally extending, spaced vanes positioned about the inner surface of the drum and angled with respect to the rotation axis of the drum such that each vane along its length traverses the inner periphery of the drum by a distance, measured circumferentially of the drum, at least approximately the distance by which such vane is spaced circumferentially from a neighboring vane, such configuration significantly improving the roasting efficiency of the roaster.

In yet another embodiement, the invention provides a roaster of the type described next above wherein the heating means comprises inner and outer concentric tubes spaced to provide an annular passageway therebetween, a gas burner mounted to one end of the inner tube and a duct carried by the adjacent end of the outer tube, and blower means for conveying ambient air to the duct. The drum includes an end wall apertured to admit and support the other discharge end of the outer tube. Ambient air flowing through the annular passageway hence is warmed by burning gas within the inner tube and emerges from the discharge end of the outer tube and mixes with burning gas simultaneously issuing from the inner tube, supplying needed combustion air thereto.

BRIEF DESCRIPTION OF DRAWINGS

FIG. 1 is a side view of the roaster of the invention as the same is mounted upon a trailer;

FIG. 2 is an exploded, broken-away view, in partial cross-section, illustrating the manner in which grain or other particulate material is conveyed to the heating drum;

FIG. 3 is an end view of the feeding means shown in FIG. 2 and as taken along line 3—3 of FIG. 2;

FIG. 4 is a broken-away, cross-sectional view taken along line 4—4 of FIG. 2;

FIG. 5 is a diagramatic view of tumbling vanes shown also in FIG. 2;

FIG. 10 is a broken-away, cross-sectional view of a modified heating tube of the invention, shown attached to a burner;

FIG. 11 is a cross-sectional view taken along line 11—11 of FIG. 10;

BEST MODE OF CARRYING OUT THE INVENTION

Figure 9:
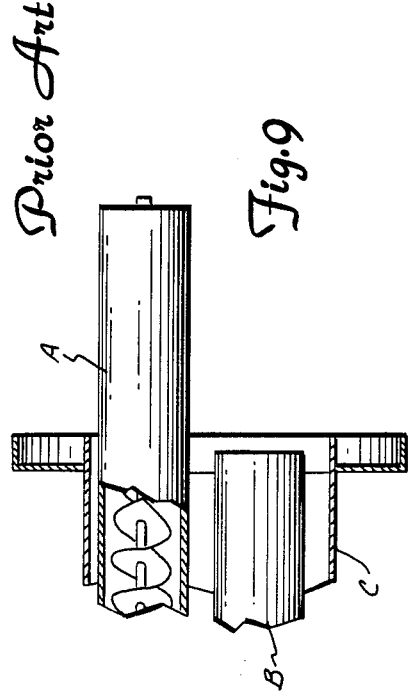
FIG. 9 is a view similar to that of FIG. 2 but showing a prior art particle feeding mechanism.

Referring first to FIG. 1, the grain roaster of the invention is designated generally as (10). The roaster includes a generally horizontal drum (12) having inner and outer, generally concentric walls (12.1) and (12.2), connected at their ends by flanges (12.3) and (12.4) (FIG. 4) respectively. The outer wall (12.2) may be longitudinally ribbed as shown best at 12.5 in FIG. 4. For ease of understanding, the left end of the drum shown in FIG. 1 will be sometimes termed the "output" or "rearward" end, and the right-hand end of the drum will be sometimes termed the "input" or "forward" end.

The drum is rotatably mounted upon a stand or, as shown in FIG. 1, a trailer (14), permitting the roaster to be moved from one location to another. The drum may be of various dimensions, and a typical drum may be on the order of ten feet (about three meters) long and may have an inner diameter of about thirty inches (about 76 cm.).

Extending axially into the output end of the drum is a drive shaft (12.6), the shaft being attached to the inner surface (12.7) of the drum by radially extending connecting rods (12.8). The drive shaft, extending through the output end of the drum, is driven by an electric motor (12.9) through gear box (13). At its input end, the drum terminates in a smooth outer surface (13.6) that is supported by trailer-mounted rollers (13.2), thereby permitting the drum to be freely rotated about its axis. Interiorly, the drum is provided with a series of longitudinally extending vanes (13.1) extending substantially the entire interior length of the drum. With reference to FIG. 4, each vane preferably has a short, radially extending portion (13.2) terminating radially in a bent-over portion directed generally in the direction of rotation of the drum, this configuration enabling the vane to scoop up particles (represented diagramatically in FIG. 4 as "P") as the drum rotates. Adjacent the input end of the drum, the vanes include a short oblique section (13.4) angling forwardly slightly in the direction of rotation of the drum, the sections (13.4) being adapted to encounter particles at the bottom of the drum and, as each such section is rotated through approximately ninety degrees, to permit the particles to slide downwardly and rearwardly slightly before the vane reaches a rotational position in which the particles fall downwardly through the interior of the drum.

A cover plate, shown generally in FIG. 2 as (16) is employed to cover the open input end (13.5) of the drum. The cover plate includes an annular flange (16.1) having short, forwardly extending, concentric inner and outer skirts (16.2), (16.3) which slidingly fit around the annular flange at (12.4) at the input end of the drum. Extending forwardly of the flange (16.1) is a cylindrical enclosure designated (16.4) terminating forwardly in a wall (16.5). For ease of maintenance, the cover plate (16) may be hinged to a support at one side of the drum so that it may be swung out of the way for access to the input end of the drum.

A particle hopper (18) is supported above and in front of the drum, as shown in FIG. 1, and has downwardly converging walls (18.1) communicating with a generally horizontal feed tube (18.2), the feed tube extending through and being fastened to the wall (16.5) of the cylindrical enclosure (16.4) and being positioned, generally, in an upper quadrant thereof. The feed tube terminates rearwardly adjacent the open end (13.5) of the drum. Carried within the feed tube is an auger (18.3), the drive shaft (18.4) of which extends forwardly and is driven by an electric motor (18.5) through an appropriate gear box (18.6). A chute (18.7) having a rearwardly and downwardly inclined bottom surface (18.8) and generally vertical side walls (18.9) is attached to the feed tube (18.2) adjacent its end, the bottom portion (19) of the feed tube being configured to fit snugly to, and preferably being welded to, the side walls and bottom wall of the chute. The bottom wall (18.8) of the chute terminates downwardly in a smooth edge (19.1) adjacent but spaced slightly above the vanes at the input end of the drum.

Heating means, typified by a gas burner (20) of known design, is positioned forwardly of the drum and is arranged to direct flames rearwardly through a generally horizontal burner tube (20.1). The latter tube extends through, and is attached as by welding to, the wall (16.5) of the cylindrical enclosure, and is generally positioned in a lower quadrant of the cylindrical enclosure diagonally opposed to the feed tube (18.2), all as shown best in FIG. 3. The heating tube terminates rearwardly adjacent the open end (13.5) of the drum. Additionally, a blower, designated generally as (24) in FIG. 1 and driven by an electric motor (24.1) is provided with a duct (24.2) formed in the clyndrical wall of the cylindrical enclosure (16.4) to deliver air under pressure into the cylindrical enclosure, past the feed tube and heating tubes, and into the drum.

Adjacent the output end of the drum is mounted an enclosure designated generally (26) and having circomferential flanges (26.1) slideably positioned with respect to the output end of the drum to effectively seal the latter end. The enclosure (26) is provided with an upwardly open end (26.2) providing a vent for the exhaust of gases and ash particles from the drum. Converging, downwardly extending side walls (26.3) terminate in an open bottom (26.4) through which roasted particles emerge for collection in cooling bins or the like.

The temperature of gases in the drum is regulated by known means, including a sensor (not shown) mounted in the exhaust port (26.2) and communicating with a controller (not shown) controlling the burner (20), all in a known manner. If desired, the output of the blower (24) can be similarly regulated. The feed rate of particles to the drum is regulated by the auger speed, in a known manner. It will be understood that temperature in the drum is positively controlled by regulation of the gas flow to the burner, may be decreased as the flow of air from the blower (24) is increased (in the event the blower speed is regulated), and is also decreased as the feed rate of particles to the drum is increased. Temperatures at the exhaust vent typically range from about 350° F. (about 175° C.) to about 750° F. (about 400° C.). The flow rate at which particles traverse the length of the drum is controlled by the feed rate of particles to the drum, by the rate of air flow from the blower (24) through the drum, and by the angle that the drum makes with the horizontal, the drum commonly being adjusted so that its input end is at a slightly higher elevation than the output end. Transit times of particles through the drum typically are on the order of one and one-half to two minutes.

In one embodiment, the invention is particularly characterized by the use of the chute (18.7). With reference to FIG. 2, it will be understood that as grain or other particulate material is conveyed by the auger (18.3) through the feed tube (18.2) and into the chute (18.7), the particles will slide down the lower wall (18.8) of the chute, and a slight rearward motion will be imparted to the particles. In this manner, particles issuing from the rearward edge (19.1) of the chute are deposited gently against the adjacent inner surface (12.7) of the drum, the thus-deposited particles readily coming to rest in the drum without significant bouncing against the hard inner surface of the drum. Moreover, substantially all but the very finest particles issuing from the feed tube are deposited at substantially the same position within the drum. Further, the chute (18.7), positioned as it is with respect to the heater tube (20.1), protects the grain or other particulate material from contact with extremely hot air or flames as the particles are thus gently deposited in the drum. As a result, the uniformity of the roasting process is improved, and the possibility of obtaining some small underroasted particles and some large overroasted particles or clumps of particles, is reduced. With reference to FIG. 9, a prior roaster embodiment employed a feed tube designated "A" and adapted to drop particles by gravity into a rotating, heated drum of the type described. Because particles tended to bounce for significant distances forwardly and rearwardly of the drum upon impact with the hard bottom surface of the drum, the feed tube "A" was positioned well within the drum so that the rearwardly bouncing particles, hopefully, would not become lodged within the circumferential enclosure "C". Although operation of the device has provided reasonable roasting results, it was noted that particles issuing from the drum occasionally were overroasted, and occasionally appeared as clumps of particles, rather than individual particles such as kernels of corn. One source of the problem was eventually traced to the position and the long extension of the feed tube into the drum. The feed tube itself was thought to become very hot because of the proximity to it of the hot air and flames issuing from the heating tube. It was postulated that the feed or other particulate material within the feed tube probably tended to agglomerate into large lumps while still in the feed tube. The lumps issuing from the drum were found to be greatly overroasted and charred. As discussed above, the present invention eliminates this problem and largely avoids as well the problem of particulate materials bouncing forwardly and rearwardly in the drum.

In use, grain such as corn or other particulate material is fed from the hopper (18) into the feed tube from which it is augered rearwardly into the drum, the particles sliding down the chute (18.7) and relatively gently contacting the inner surface of the drum at its bottom. Because of the flow of air through the drum imparted by the blower (24), and further because of the slight downward tilt of the drum from its input to its output end, the particles are slowly conveyed through the length of the drum. As the drum rotates, particles that are picked up at the bottom of the drum by the vanes (13.1) cascade downwardly through the drum interior as the vanes are rotated into upper portions of the drum. There is thus provided a continuous cascade of particles throughout substantially the length of the drum, except at the input end thereof as described above. The speed of movement of any given particle through the drum is limited by the other particles around it, and little undue bouncing of particles forwardly or rearwardly of the drum is encountered. Very fine, dust-like particles may be instantaneously burned and/or are blown rapidly through the drum and are hence rapidly eliminated from the drum, thereby reducing fire hazards associated with the exposure of very fine particles to flame. Because the particles entering the drum are laid into the drum in a relatively gentle manner, the passage of particles through the drum is characterized by greater uniformity; that is, the likelihood of each particle being roasted to the same degree is improved. Further, there is substantially no undesired retention of particles at or near the input end of the drum. The transit time of all particles through the drum is characterized by increased uniformity. Because of the effect of the flow of air from the blower (24), smaller or lighter particles tend to have a slightly faster transit time through the drum, but this is desirable in as much as smaller or lighter particles are roasted somewhat more quickly than are larger, heavier particles. In the case of grain, such as corn, there is little variation between individual kernel sizes.

The roaster of the invention may be used to heat-treat a large variety of particles. For example, "poultry litter", made of sawdust or other dry, absorbent materials, can rapidly become fouled by poultry droppings but can be largely reprocessed by subjecting it to heat in the roaster. Because poultry litter is very dry and hence somewhat more flammable than grain, it is desired to avoid any contact of flames from the burner tube with the litter.

Figure 6:
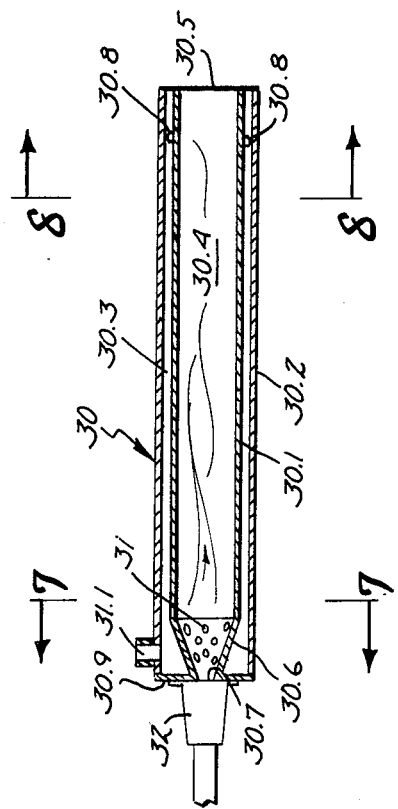
FIG. 6 is a broken-away, cross-sectional view of a heating tube of the invention, shown attached to a burner.
Figure 7:
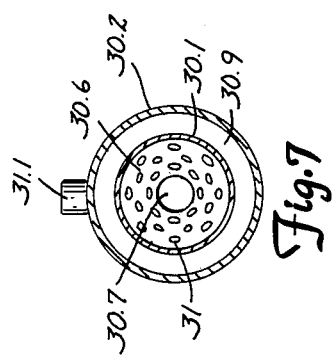
FIG. 7 is a cross-sectional view taken along line 7—7 of FIG. 6.
Figure 8:
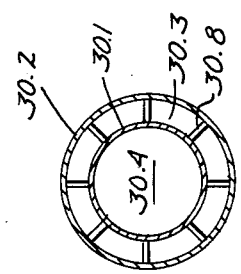
FIG. 8 is a cross-sectional view taken along line 8—8 of FIG. 6.

FIG. 6 depicts a burner tube (30) that can be employed with a rotating drum-type roaster such as that described above. The burner tube is generally cylindrical in shape, and includes inner and outer concentric walls (30.1), (30.2) defining an annular space (30.3) extending substantially the length of the tube. The inner wall (30.1) defines an elongated interior passage (30.4) that opens at one end (30.5) into the rotating drum. Adjacent its other end, the inner wall (30.1) converges as shown at (30.6) to form a somewhat narrow opening (30.7). Supporting straps (30.8) are employed to rigidly connect the inner and outer walls of the tube adjacent the end (30.5). At its other end, the tube is provided with a transverse flange (30.9) joining in the inner and outer walls and providing a surface to which a burner (32) of common design, such as the gas burner described above, may be attached, the burner (32) being attached to the flange (30.9) in such a position as to direct flames longitudinally within the interior passage toward the end (30.5). The converging walls (30.6) is provided with a series of apertures (31) therethrough. At least one port (31.1) is provided in the outer wall (30.2), and air, as from the blower (24), enters the angular space (30.3), is heated by the inner wall (30.1), and enters the interior passage (30.4) through the apertures (31), the heated air thus providing makeup combustion air and also serving to maintain the outer wall (30.2) at a reasonably cool temperature to avoid excessive heat loss from the burner tube. Further, the burner tube (30) is of sufficient length so that flames from the burner (32) are substantially completely dissipated within the tube so that only hot gases (combustion product gases and air) issue from the end (30.5).

Utilizing the heating tube (30), as the same may be employed with a rotating drum roaster such as the type described above, turkey or other poultry litter or other dry, flammable material may be fed into the drum and subjected to the hot gases from the burner tube as the particles cascade through the drum. In the case of poultry litter, the heat treatment thus applied vaporizes and removes volatile constituents of poultry droppings, tends to kill microorganisms, and results in a reusable poultry litter that is substantially free of objectionable odor. Poultry litter can thus be recycled many times before it must be discarded, thereby reducing the inherent pollution problem and also significantly reducing the cost of raising poultry.

Another embodiment of a burner tube is shown in FIGS. 10 and 11 generally as (34). The tube comprises spaced, concentric inner and outer walls (34.1), (34.2) joined at one end by an annular flange (34.3 and at the other end by radial, supporting straps (34.4), the walls defining between them an annular space (34.5) and the inner wall (34.1) defining an elongated interior passage (34.6) extending from the flange (34.3) rearwardly and terminating in an open end (34.7) spaced interiorly of the rearward end (34.8) of the outer wall (34.2). A plurality of apertures (34.9) are formed through the inner wall (34.1), desirably throughout the length of the inner wall. At least one port (35) is provided through the outer wall (34.2) to permit pressurized air from a blower (shown schematically as 35.1) to enter the annular space (34.5). Burner means, typified by a gas burner (35.2), is attached to the flange (34.3) and includes a pipe (35.3) extending within the passage (34.6). A second blower shown schematically as (35.4) supplies combustion air to the burner (35.2).

In use, combustion air under pressure developed by the blower (35.4) is supplied to the burner (35.2) and the resulting flames exit rearwardly through the pipe (35.3) into the interior passage (34.6). Air under pressure developed from the blower (35.1) is supplied to the port (35), such air entering the internal passage through the apertures (34.9) to supply combustion air to the passage along the length of the inner wall. The opening (35.5) of the annular space (34.5) into the passage (34.6) at the end (34.7) of the inner wall may be restricted as needed, as by circumferential bead (35.6) formed at the rearward end of the inner wall (34.1), to ensure that at least a significant amount and preferably a majority of the air within the annular space (34.5) flows through the apertures (34.9) into the internal passage (34.6). The air passing in the annular space, as with the previous embodiment, serves also to cool the outer wall (34.1).

By supplying combustion air in large quantities, by both blowers (35.1) and (35.4), it is believed that more complete combustion occurs and the length of the flame extending rearwardly from the pipe (35.3) is reduced. The length of the outer wall may be on the order of five feet (about 1.5 meters) and the length of the inner wall may be about four feet (about 1.2 meters). The inner diameter of the outer wall may be about 12.5 inches (about 32 cm.) and the radial distance between the inner and outer walls may be about 1.25 inches (about 3.2 cm.). The length of the heating tube is sufficiently long as to dissipate flames along its length so that no flames enter the roaster drum.

Figure 12:
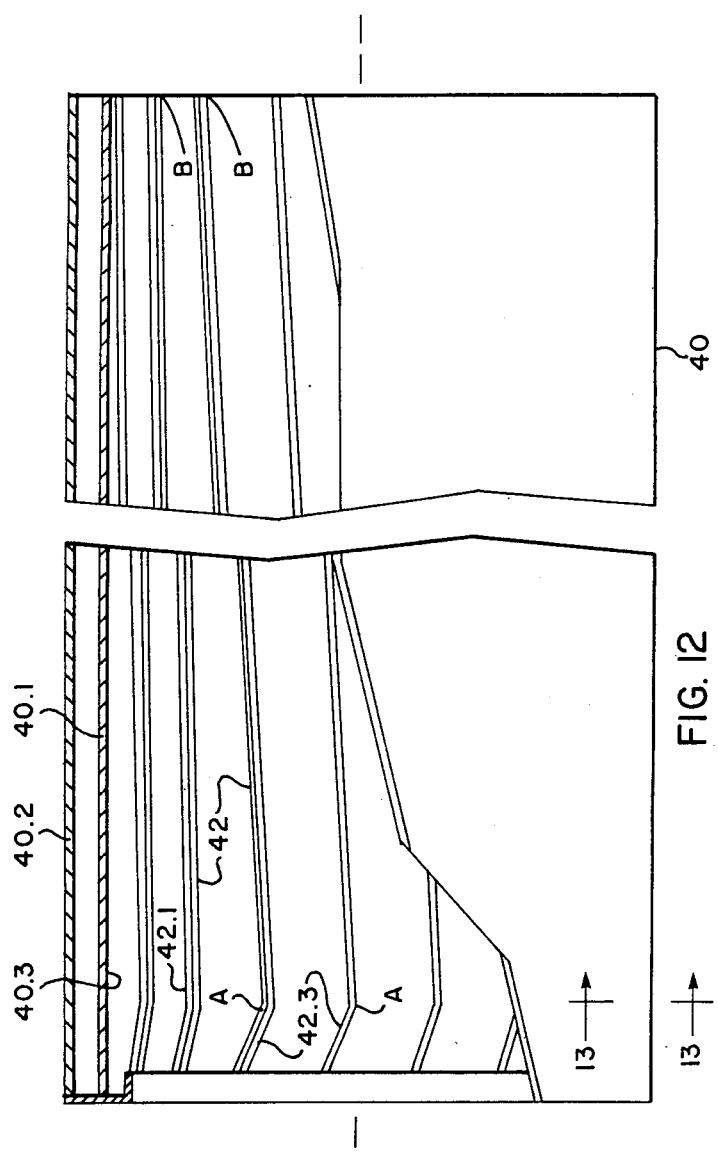
FIG. 12 is a broken-away, largely diagramatic view similar to FIG. 2 and illustrating a preferred feature of the inveniton.
Figure 13:
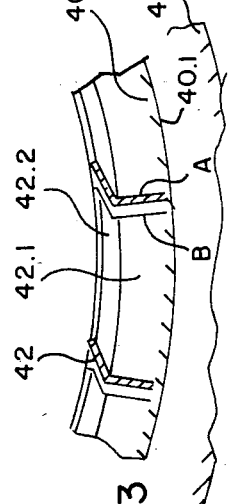
FIG. 13 is a broken-away cross-sectional view taken along line 13—13 of FIG. 12.

Another embodiment of the invention is depicted generally in FIGS. 12 and 13 of the drawing. FIG. 12 is similar to the right-hand portion of FIG. 2, and shows, in broken-away, cross-sectional form, a portion of the interior of a rotating drum (40) having inner and outer, generally concentric walls (40.1), (40.2). The drum is substantially the same as that described above, except that the vanes (42) thereof do not extend precisely parallel to the axis of rotation of the drum but rather extend longitudinally through the drum at a slight angle to lines drawn parallel to the drum axis. As desscribed above, each vane, viewed in cross-section, has a short, radially extending portion (42.1) terminating radially in a bent-over portion (42.2) directed generally in the direction of rotation of the drum, and each vane desirably includes a short oblique section (42.3) angling forward slightly in the direction of rotation of the drum adjacent the input end of the drum. The remainder of the length of each vane extends through the length of the drum and the vanes are spacedly positioned about the inner periphery (40.3).

In this preferred embodiment, each vane (42) extends from a point (labeled "A") in the drawing adjacent the input end of the drum to a point "B" at the output end, the vane between points A and B traversing the inner periphery (40.3) of the drum by a distance, measured circumferentially of the drum, at least approximaterly equivalent to the distance by which the vane is spaced circumferentially from a neighboring vane. Desirably, each vane has a point A adjacent one end of the drum that is longitudinally substantially aligned, in a direction parallel to the axis of the drum, with a point B of a neighboring vane. FIG. 13 is a view taken along the length of the inner drum periphery (40.3) in a direction parallel to the axis of rotation of the drum, and the substantial alignment of points A and B of neighboring vanes is readily visualized.

It has been found that when the vanes are angled as described above with reference to FIGS. 12 and 13, in contrast being substantially parallel to the axis of the drum as shown in FIGS. 2 and 4, the roasting efficiency of the drum is substantially and unexpectedly increased. In one experiment, No. 1 corn containing 13% moisture was roasted in a roaster of the invention provided, in one run, with vanes parallel to the axis of the drum and, in another run, with vanes set at an angle of 3° to lines parallel to the axis of the drum at the inner drum periphery, the latter vanes being configured substantially as shown in FIGS. 12 and 13 and having the opposed ends A and B of neighboring vanes substantially aligned parallel to the drum axis. In the table that follows, "gas pressure" refers to the pressure of the fuel gas entering the burner (20), "stack temperature" refers to the temperature of gases exhausting through the vent shown at (26.2) in FIG. 1, and the "product temperature" refers to the temperature of the roasted corn as the same merges from the open bottom (26.4) in FIG. 1, for collection.

For each run, corn was introduced to the drum through the hopper (18) (FIG. 1) and the gas pressure and throughput rate of the corn was adjusted so that the roasted corn from each run was substantially identically and completely roasted. A subsequent analysis of the roasted corn from each run show that the products of the run received substantially the same degree of roast, as indicated by total digestible nutrients, percent moisture and percent crude protein.

TABLE I

Roasting of 13% Moisture No. 1 Corn

| | Roaster With Vanes Parallel to Drum Axis | Roaster With Vanes at Angle to Drum Axis |
|---|---|---|
| Product Temperature, °F. | 250 | 273 |
| Stack Temperature, °F. | 575 | 525 |
| Gas Pressure | 11 p.s.i | 9 p.s.i |
| Product Throughput, pounds/hour | 11640 | 14250 |

As indicated by the throughput data in the Table, the use of angled vanes in the drum resulted in more than a 22% increase in throughput, notwithstanding the reduction in gas pressure.

In another experiment, the cascade of corn dropping from vanes of the drum as the latter was rotated was visualized through removal of an end of the drum. In the embodiment depicted in FIGS. 2 and 4, in which the vanes extended parallel to the axis of the drum, grain was observed to fall from each vane as a sheet of material having a thickness, measured transversely of the drum axis, of from about 1–3 inches. Inasmuch as the vanes of the drum are spaced apart a greater distance, spaced sheets of grain were observed to fall from the respective vanes, the sheets being separated in a direction parallel to the drum axis. In the embodiment utilizing angled vanes as depicted in FIGS. 12 and 13, the sheets of grain dropping from the respective vanes were disposed at an angle to the axis of the drum such that a sheet of grain dropping from one vane adjacent an end of that vane was substantially axially aligned with the sheet of grain dropping from an adjacent vane at the opposite end of that vane, thereby providing a tortuous path through the sheets of falling grain and, it appears, resulting in increased heat transfer to the grain kernels leading to faster roasting and hence an allowable throughput of grain through the roaster.

It will be understood that opposed ends of the angled length of neighboring vanes need not be precisely aligned parallel to the axis of the drum, since the sheets of particulate material cascading from the vanes tend to expand in thickness. However, the vanes should be so angled as to provide a cascade of grain from individual vanes defining a tortuous path axially through the drum.

Figure 14:
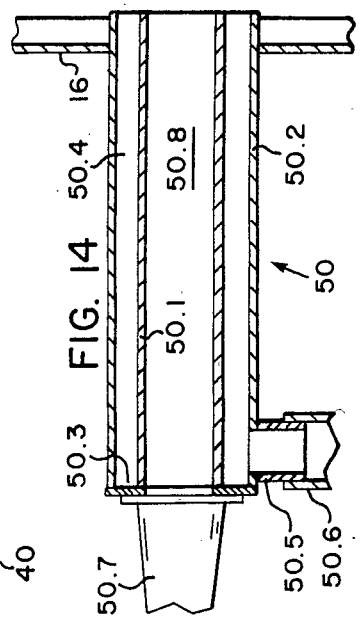
FIG. 14 is a diagramatic, cross-sectional view of a modified heating tube of the invention.

FIG. 14 depicts yet another embodiment of a burner tube designated generally as (50), the tube comprising spaced, concentric inner and outer walls (50.1) and (50.2) that are joined at one end by an annular flange (50.3) in a manner similar to that described above with reference to FIGS. 10 and 11. At its other end, the outer wall (50.2) extends through and is attached to the cover plate (16) (shown also in FIGS. 2 and 3) covering the open input end of the drum, the heating tube extending parallel to the drum axis. Depending on the length of the inner and outer walls, supporting straps (not shown) similar to the straps (34.4) in FIG. 10 may be provided. The inner and outer walls desirably are co-extensive along their length, and define between them an annular air space (50.4). The outer wall (50.2) is provided at its inlet end with a duct (50.5) to which is mounted an air blower shown partially as (50.6) in FIG. 14 and which is similar to that shown at (35.1) in FIG. 10. Similarly, a gas burner (50.7), similar to that shown at (35.2) in FIG. 10, is connected to the flange (50.3) so as to provide gaseous fuel to the interior tube (50.8) defined by the inner wall (50.1).

In use, flames issue from the burner (50.7) within the inner tube (50.8) at high velocity and exit into the drum in a direction generally parallel to the drum axis. Concurrently, ambient air is forced into the annular space (50.4) by the blower (50.6), and in its travel through the annular space from one end thereof to the other, becomes warmed by the heated surface of the inner wall (50.1) and thence exits at high velocity into the drum, the air from the annular space (50.4) at least initially enveloping the flames issuing from the inner tubular interior (50.8) and thence mixing with the flames to supply further combustion air. In this embodiment, flames from the burner (50.7) are permitted, desirably, to enter the drum and commonly extend into the drum through a large portion of the drum's length. The air issuing from the annular space (50.4) tends to temper the flames, to provide further combustion air, and to increase turbulence within the drum. The inner wall (50.1) preferably is made of material having high thermal conductivity, commonly steel. The outer wall (50.2) may similarly be made of steel, but may be provided with an outer coating of insulation (not shown) as desired. The rush of air through the annular space (50.4), as noted above, receives thermal energy from the inner wall (50.1) and hence is warmed; the outer wall (50.2), accordingly, remains reasonably cool. The configuration of the burner tube of FIG. 14, hence, results in the loss of a comparatively small amount of heat from the burner tube, and proving the energy efficiency of the system. When utilized in combination with the angled vanes escribed above in connection with FIGS. 12 and 13, the thermal efficiency of the roaster as a whole is substantially improved and results in higher output grain temperatures and lower stack temperatures, as indicated in Table I.

While a preferred embodiment of the present invention has been described, it should be understood that various changes, adaptations, and modificiations may be made therein without departing from the spirit of the invention and the scope of the appended claims.

What is claimed is:

1. A roaster for roasting particulate material such as grain and comprising a cylindrical, generally horizontal drum having an axis of rotation and having an inner surface, means for rotating the drum about its axis, heating means adjacent one end of the drum for directing heated gases inwardly of the drum, means for feeding particles to said one end of the drum, and means for withdrawing roasted particles from the other end of the drum, the roaster being characterized by including a plurality of longitudinally extending, spaced vanes positioned about and carried by the inner surface of the drum and angled with respect to the rotational axis such that each vane along its length traverses the inner surface of the drum by a distance, measured circumferentially of the drum, of approximately the distance by which each such vane is spaced circumferentially from a neighboring vane, thereby providing a tortuous path between sheets of particulate material cascading from the vanes as the drum is rotated and significantly improving the roasting efficiency of the roaster.

2. The roaster of claim 1 wherein said feeding means comprises chute means positioned out of the path of the heated gases for feeding particulate materials to the one end of the drum, the chute means having a lower end adjacent the bottom of the internal surface of the drum to lay particles against said bottom surface adjacent its one end and to thereby reduce bouncing of the particles.

3. The roaster of claim 2 in which the chute means includes a particle-guiding surface extending downwardly and inwardly of the drum to reduce bouncing of the particles toward said one end as the particles are laid against the bottom inner surface of the drum.

4. The roaster of claim 1 wherein the feeding means comprises a feed tube having a forward end extending toward the interior of the drum adjacent the upper internal surface of the drum, and chute means comprising a chute extending from the forward end of the feed tube downwardly and interiorly of the drum adjacent the bottom of the internal surface of the drum, whereby particles issuing from the feed tube are caused to fall downwardly and forwardly in the chute under the force of gravity, the particles being laid gently against the bottom surface adjacent its one end to thereby reduce bouncing of the particles.

5. The roaster of claim 1 wherein the heating means comprises an exterior burner and an exterior heating tube for directing heated gases interiorly of the drum at its one end, and wherein the said chute is positioned to the side of the heating tube and out of the path of heated gases issuing therefrom.

6. The roaster of claim 5 wherein the heating tube is of sufficient length as to completely dissipate, along its length, flames from the burner.

7. The roaster of claim 1 wherein the heating tube comprises spaced inner and outer concentric walls defining an interior passage for flames and heated gases and an annular space between the walls, the heating tube being attached at one end to a burner to receive flames and heated gases within the interior passage thereof and being attached at its other end to the drum to issue said flames and heated gases into the drum substantially parallel to the rotational axis thereof, the outer wall of the heating tube being provided, adjacent its one end, with a duct communicating with the annular space, blower means communicating with the duct to supply ambient air under pressure to the annular space, the annular space communicating at its other end with the interior of the drum to supply additional combustion air into the drum in the vicinity of the gases and flames issuing into the drum from the interior passage, air flow through the annular space receiving thermal energy from the inner wall and delivering the same into the drum.

8. The roaster of claim 7 wherein the inner wall of the heating tube is provided with apertures therethrough to supply air including combustion air to the interior passage.

9. A roaster for roasting particulate material such as grain and comprising a cylindrical, generally horizontal drum having an axis of rotation and having an inner surface, means for rotating the drum about its axis, heating means comprising a heating tube having spaced inner and outer concentric walls defining an interior passage for flames and heated gases and an annular space between the walls, the heating tube being attached at one end to a burner to receive flames and heated gases within the interior passage and being attached at its other end to the drum at one end thereof, the outer concentric wall of the heating tube having a duct therein adjacent its one end, blower means for flowing ambient air into the annular space through the duct and thence into the drum, said air receiving thermal energy from the inner wall of the heating tube, particle feeding means adjacent the one end of the drum and positioned out of the path of the heated gases for feeding particles to the one end of the drum, the feeding means including chute means having a lower end adjacent the bottom of the internal surface of the drum to lay particles against said bottom surface adjacent its one end to thereby reduce bouncing of the particles, and a plurality of longitudinally extending, spaced vanes positioned about and carried by the inner surface of the drum with respect to the rotational axis such that each vane along its length traverses the inner surface of the drum by a distance, measured circumferentially of the drum, approximately the distance by which each such vane is spaced circumferentially from a neighboring vane, thereby providing a tortuous path between sheets of particulate material cascading from the vanes as the drum is rotated.

10. The roaster of claim 9 where in the chute means includes a particle-guiding surface extending downwardly and inwardly of the drum to reduce bouncing of the particles toward said one end of the drum.

11. The roaster of claim 10 wherein said chute is positioned to the side of the heating tube and out of the path of heated gases issuing therefrom.

12. The roaster of claim 10 in which the inner and outer concentric walls of the heating tube are substantially co-extensive in length.

* * * * *